(12) United States Patent
Fu

(10) Patent No.: US 10,595,156 B2
(45) Date of Patent: Mar. 17, 2020

(54) POSITION ESTIMATING LIGHTING SYSTEM AND POSITION ESTIMATING METHOD

(71) Applicant: ZYNE HONG KONG LTD, Hong Kong (CN)

(72) Inventor: Wah Fu, Hong Kong (CN)

(73) Assignee: ZYNE HONG KONG LTD, Hong Kong (CN)

( * ) Notice: Subject to any disclaimer, the term of this patent is extended or adjusted under 35 U.S.C. 154(b) by 0 days.

(21) Appl. No.: 16/221,458

(22) Filed: Dec. 15, 2018

(65) Prior Publication Data

US 2019/0208353 A1 Jul. 4, 2019

Related U.S. Application Data

(63) Continuation of application No. PCT/IB2017/053553, filed on Jun. 15, 2017.

(60) Provisional application No. 62/350,648, filed on Jun. 15, 2016.

(51) Int. Cl.
*H04W 4/02* (2018.01)
*H05B 33/08* (2020.01)
*H05B 37/02* (2006.01)
*H04B 10/116* (2013.01)
*H04W 4/06* (2009.01)

(52) U.S. Cl.
CPC ............ *H04W 4/02* (2013.01); *H04B 10/116* (2013.01); *H04W 4/06* (2013.01); *H05B 33/0845* (2013.01); *H05B 37/02* (2013.01); *H05B 37/029* (2013.01); *H05B 37/0272* (2013.01)

(58) Field of Classification Search
CPC ....... H04B 10/116; H04B 10/11; H04W 4/80; H04W 4/20; H04W 4/02
USPC .......................... 455/418, 456.1, 456.2, 515
See application file for complete search history.

(56) References Cited

U.S. PATENT DOCUMENTS

2016/0345414 A1* 11/2016 Nolan .................... G08C 17/02
2017/0230194 A1*  8/2017 Nie ....................... H04L 12/282

* cited by examiner

*Primary Examiner* — Sam Bhattacharya
(74) *Attorney, Agent, or Firm* — Wayne & Ken, LLC; Tony Hom

(57) ABSTRACT

Disclosed is a position estimating lighting system, for being applied in a building or premise. The system includes a server, connected to at least one gateway device, a plurality of lighting devices for being distributed around the building or premise, each of the lighting devices comprising a static module wirelessly connected to the at least one gateway device, and a plurality of mobile terminals, wirelessly connected to adjacent static modules and/or gateway device. For each mobile terminal, one of the adjacent static modules and/or gateway device calculates position information of the mobile terminal, and delivers the position information to the server by the at least one gateway device, and the server collects the position information of the plurality of mobile terminals and modulates illumination of the plural lighting devices based on the position information.

19 Claims, 13 Drawing Sheets

| IEEE 802.15.4 based wireless technologies | | | | |
|---|---|---|---|---|
| Wireless Technology | ZigBee | Thread | 6LoWPAN | LoRaWAN |
| Industry organizations | ZigBee Alliance | Thread Group | 6LoWPAN IETF Group | LoRa Alliance |
| Network topology | All | Star, Mesh | All | Star-of-Stars |
| Data rate | 250 kbps | 250 kbps | 250 kbps | 0.3-50 kbps |
| Range | 10-300 m | N/A | N/A | 2-5 km (urban), 15 km (suburban) |
| Max. nodes | 65,000 | 250+ | N/A | N/A |
| Power | Very low | Very low | Very low | Very low |
| Table 1 | | | | |

FIG. 11

POSITION ESTIMATING LIGHTING SYSTEM AND POSITION ESTIMATING METHOD

CROSS-REFERENCE TO RELATED APPLICATION

This application is a continuation of International Patent Application No. PCT/IB2017/053553, filed on Jun. 15, 2017 which claims the benefit of U.S. provisional application No. 62/350,648 filed on Jun. 15, 2016. The entire disclosure of the above-referenced applications are incorporated herein by reference in entirety for all purposes.

TECHNICAL FIELD

The present disclosure relates to wireless communication technology, and more particularly, to an indoor position estimating system, lighting system having the same, and position estimating method thereof.

BACKGROUND

Indoor global position system (GPS) embedded in lighting systems have recently been promoted as emerging technology by major electronics/lighting companies such as Philips Lighting and General Electric (GE). In 2016, Philips Lighting describes in its "Philips Indoor Positioning White Paper" a concept of using Visual Light Communication (VLC) of Light-emitting Diode (LED) lighting systems for indoor GPS application. In their proposal, each Philips light fixture can send a unique identification code using VLC, referring to FIG. 1. The shoppers can use the camera of their mobile phones to receive such codes. Therefore, the indoor lighting system can communicate with the shoppers in a building through VLC and provide a range of services such as shopping guidance, position instructions etc for the shoppers. A unique feature is that direct visual light is essential in this indoor GPS systems.

General Electric and a company called AcuityBrands market their Indoor Positioning System using VLC of LED lighting systems and Bluetooth technology. This concept can be illustrated through a trademark ByteLight as shown in FIG. 2. Similarly to the Philips' approach, they use VLC to locally locate and communicate with the shopper with a mobile phone. Then through the Bluetooth communication, the shopper can obtain or listen to the product information. GE in their website claims that such system can also be used in Museums to provide for the visitors the introductions and details of the items of interests when the visitors approach them.

The three technologies suggested by Philips Lighting, GE and AcuityBrands share the same common technology of VLC using LED lighting systems. GE and Acuity offer the extra use of Bluetooth to provide an extra channel of communication of product or service information. However, the use of VLC and Bluetooth have some major limitations. Firstly, the mobile communication devices of the shoppers, such as the mobile phones or smart watches of the shoppers, must be under direct light from the LED system. If the mobile phones are in the handbags of the shoppers, VLC cannot communicate with shoppers. This issue may not be a major problem if the applications are restricted to the cases that the shoppers must hold their mobile communication devices in their hands. But this issue will be a major limitation if the application is needed to expand to other areas such as counting the number of the people and monitoring the flow of people whose mobile communication devices are not under direct light of the lighting system. Secondly, the communication range of Bluetooth is relatively short, typically 10 meters. For large buildings with tall ceilings such as airports, the use of Bluetooth may not be appropriate.

SUMMARY

A position estimating lighting system is provided in an embodiment of the present disclosure. The position estimating lighting system, for being applied in a building or premise, includes a server, connected to at least one gateway device, a plurality of lighting devices for being distributed around the building or premise, each of the lighting devices including a static module wirelessly connected to the at least one gateway device, and a plurality of mobile terminals, wirelessly connected to adjacent static modules and/or gateway device. Wherein for each mobile terminal, one of the adjacent static modules and/or gateway device calculates position information of the mobile terminal, and delivers the position information to the server by the at least one gateway device, and the server collects the position information of the plurality of mobile terminals and modulates illumination of the plural lighting devices based on the position information.

A lighting device is provided in another embodiment of the present disclosure. The lighting device, for being distributed in a building or premise, includes a light controller, switching and modulating a luminescent unit connected, and a static module connected with the light controller forming a mesh network with other static module and wirelessly connected to an gateway device, at least one mobile terminal wirelessly connected to the static module, wherein the gateway device is connected with a server, the static module calculates position information of the connected mobile terminal, and delivers the position information to the server by the gateway device, and the server collects the position information of the at least one mobile terminal and modulates illumination of the luminescent unit based on the position information.

A lighting system is provided in still another embodiment of the present disclosure. The lighting system, for being applied in a building or premise, includes a server connected to at least one gateway device, a plurality of static modules for being distributed around the building or premise wirelessly connected to the at least one gateway device, and a plurality of mobile terminals, wirelessly connected to adjacent static modules and/or gateway device. Wherein for each mobile terminal, one of the adjacent static modules and/or gateway device calculates position information of the mobile terminal, and delivers the position information to the server by the at least one gateway device, and the server collects the position information of the plurality of mobile terminals and forms flow information.

A position estimating method is provided in more another embodiment of the present disclosure. The position estimating method, for being applied in a building or premise, and executed by a position estimating system, the position estimating system includes a server connected to at least one gateway device, a plurality of static modules for being distributed around the building or premise wirelessly connected to the at least one gateway device and a plurality of mobile terminals, the method includes:

providing a wireless signal coverage area by the static modules, detecting adjacent static modules and/or gateway device by the mobile terminal,
connecting the adjacent static modules and/or gateway device detected,
calculating position information of the mobile terminals by a connected mobile terminal and/or gateway device,
delivering the position information to the server by the at least one gateway device, and
collecting the position information of the plurality of mobile terminals and forming flow information by the server.

BRIEF DESCRIPTION OF THE DRAWINGS

One or more embodiments are illustrated exemplarily, with reference to pictures in corresponding attached drawings, and these exemplary descriptions are not intended to limit embodiments, wherein elements having the same reference numerals represent the same or similar elements. Obviously, solutions in following drawings are embodiments from the disclosure, one skilled in the art, can get some relating drawings base upon the following drawings without inventive effort.

FIG. 11 is a wireless technology table listing various wireless technologies based on the IEEE 802 industry standard protocol.

DETAILED DESCRIPTION

Figure 1:
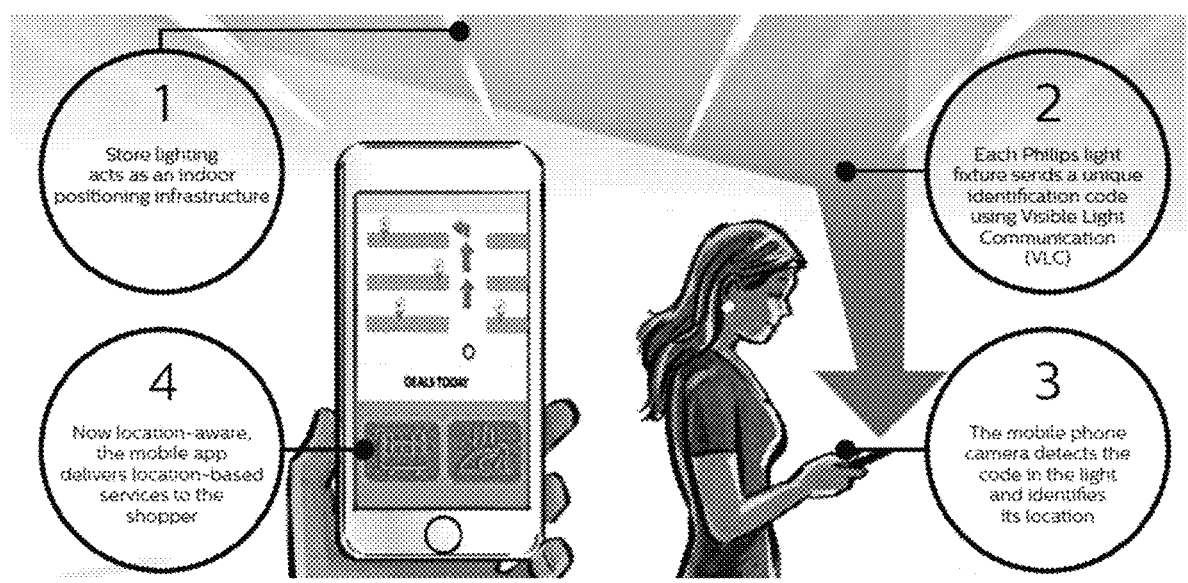
FIG. 1 is a picture illustrating an indoor positioning system in the prior art.
Figure 2:
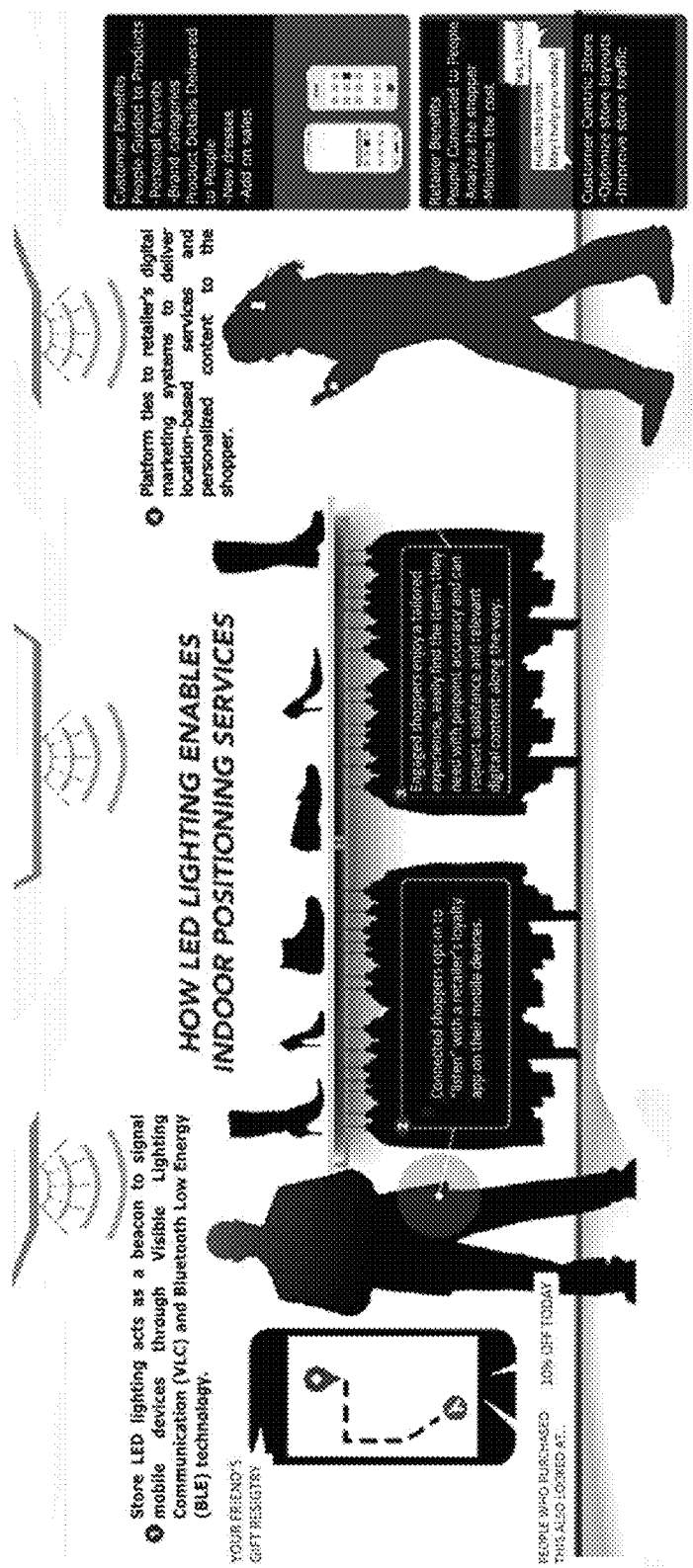
FIG. 2 is a schematic diagram of another indoor positioning system in the prior art.

To clarify the objectives, technical solutions and advantages of the embodiments of the present disclosure, the technical solutions according to the embodiments of the present disclosure are distinctly and completely described with reference to the accompanying drawings of the embodiments of the present disclosure. The described embodiments are merely exemplary ones, not all the embodiments of the present disclosure. Based on the embodiments of the present disclosure, all other embodiments derived by persons of ordinary skill in the art without any creative efforts shall fall within the protection scope of the present disclosure.

The disclosure of the present embodiments relates to the combined use of a lighting system and a position estimating wireless communication technology to provide multiple functions for management of a building or premise or objects in a building or premise. The unique features of the disclosure lie in application of distributed lighting devices. Each of the lighting device is embedded with a static module deriving from the wireless communication technology, to form a wireless mesh network. The signal and information from the wireless mesh network are used for monitoring and control of the lighting system and calculating position information of people with mobile terminal or objects carrying the compatible wireless devices, for example tags, in the building or premise.

Referring from FIG. 6 to FIG. 10, The lighting system, also be called position estimating lighting system, applied in the building or premise, includes a server 10, connected to at least one gateway device, a plurality of lighting devices distributed around the building or premise, each of the lighting devices includes a static module wirelessly connected to the at least one gateway device, and a plurality of mobile terminals, wirelessly connected to adjacent static modules and/or gateway device. For each mobile terminal, one of the adjacent static modules and/or gateway device calculates position information of the mobile terminal in reference to the adjacent static modules and/or mobile terminals, and delivers the position information to the server by the at least one gateway device, and the server collects the position information of the plurality of mobile terminals and modulates illumination of the plural lighting devices based on the position information. In addition, the server 10 analyzes the position information from all the mobile terminals to form flow information, such as people flow information and load flow information.

The position estimating lighting system has monitoring and self-diagnosis functions for the light system and has dynamic position location function so as to monitor people/objects that carry wireless compatible mobile terminals for wireless communication.

It should be noted that the following wireless mesh network descriptions is applicable to all the IEEE 802 based wireless technologies, which includes, but not limited to Bluetooth, ZigBee, Thread, 6LowPAN, and LoRaWAN, referring to relevant table in FIG. 11. Choice of the specific wireless protocol and their performance will depend on the communication range, power consumption, speed and costs of detail requirement. For illustration purpose, in the following embodiments the wireless protocol based on IEEE 802 is applied in the following descriptions.

Figure 3:
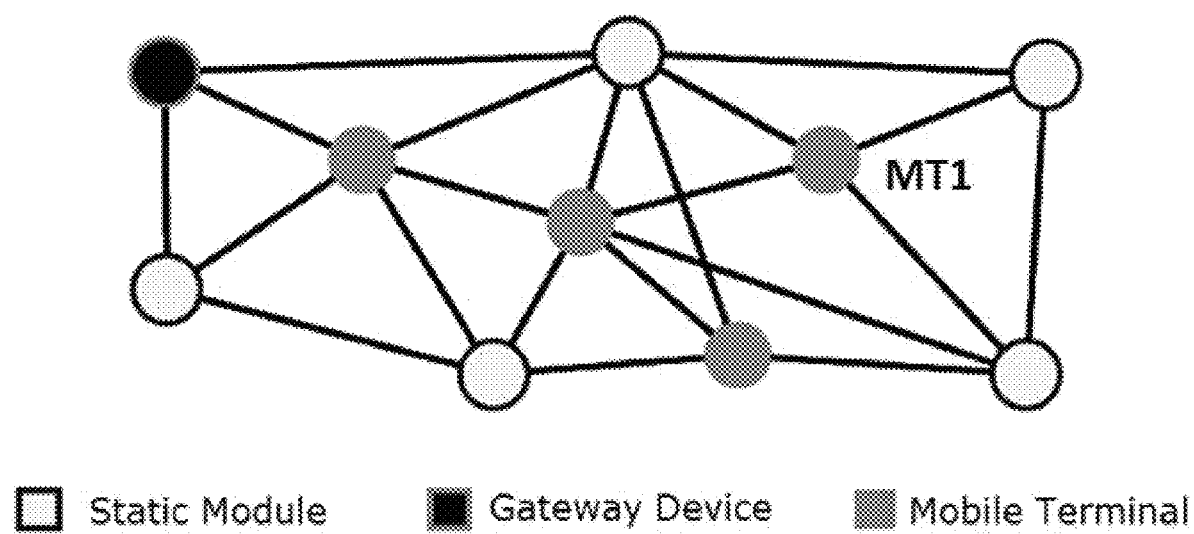
FIG. 3 is a schematic diagram illustrating a mesh network according to some embodiment of the present disclosure.

The mesh network in the embodiments is dynamic wireless network includes three type of nodes, namely gateway devices (GD), static modules (SM) and mobile terminals (MT) shown in FIG. 3. The GD and the SM are usually in fixed locations. The MT can move within the network dynamically. In the embodiments, The lighting devices embedded with the static module of the wireless technology play the role of static nodes of the mesh network. In the embodiment, each Mobile terminal includes a compatible mobile wireless controller. The mobile wireless controller e can be embedded in a portable device such as a mobile phone (carried by a person) or a wireless tag (attached to an object).

The server, for example, a computer or computer network linking the gateway device (GD) for providing coordination functions and the static modules (SM) are fixed at known location to act as the Static node for serving as a router node and providing a reference for the rest of the nodes to be located, whilst people and/or objects carrying mobile terminals or tags in the building or premise are considered as the mobile terminals (MT) in the combined network.

Figure 7:
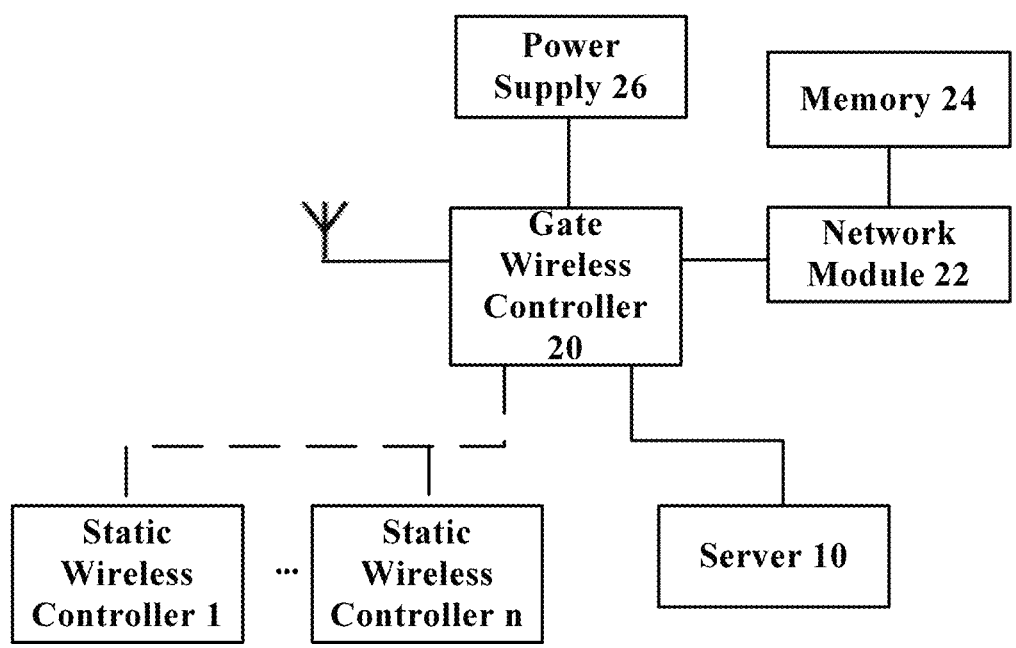
FIG. 7 is a diagrammatic view of the position estimating lighting system showing relation between a gateway device and the lighting devices according to the embodiment of the present disclosure.

Referring to FIG. 7, The Gateway Devices (GD) is used to connect the wireless mesh network to a server 10, the server can be an external computer or computer network. The GD is wall-powered and non-mobile with significant computational power. Each Gateway Device (GD) includes a gate wireless controller 20, a network module 22 and a memory 24. The server 10 is wirelessly connected with the gateway device. The gate wireless controller 20 wirelessly communicates with plural static wireless controller, for example from static wireless controller 1 to static wireless controller n. In one embodiment, the gateway device further includes a power plug to introduce power supply. In another embodiment, the gateway device can include a portable power supply, such as rechargeable lithium battery.

The Gateway device in the embodiments is connected to the server 10, such as a computer or a computer network, that acts as a coordinator of the "combined" lighting and the mesh network. Software can be developed to use the position information collected in the combined network for providing a range of functions.

Figure 8:
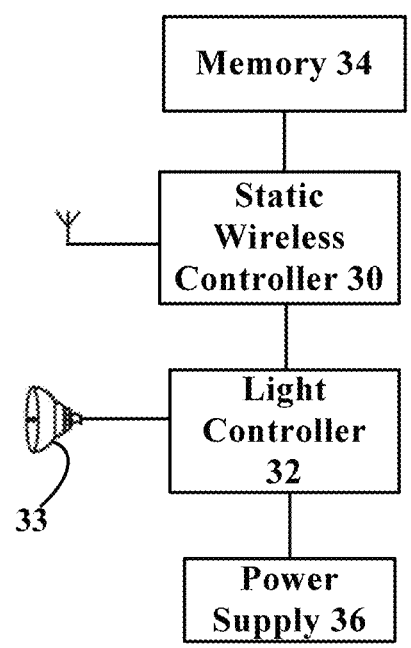
FIG. 8 is a diagrammatic view of a lighting device according to one embodiment of the present disclosure.

The Static Modules (SM) are usually wall-powered and in fixed and known locations because they will act as references for the rest of the nodes that need to be located dynamically. A group of static modules (SM) work like the satellites in a GPS system. In wireless technology embodiment, an example of the setup of a static modules (SM) is shown in FIG. 8. The static modules is installed in a lighting device. The lighting devices together with the static modules are distributed in a building or premise. The lighting device includes a light controller 32 switching and modulating a luminescent unit 33 connected and the static module is connected with the light controller 32. Plural static modules (SM) form the mesh network with other static modules. And the static modules (SM) is wirelessly connected to an gateway device and includes a static wireless controller 30 connected with the light controller 32. the lighting device further includes a memory 34 connected with the static wireless controller 30. In one embodiment, the static modules further includes a power plug to introduce power supply. In another embodiment, the static modules can include a portable power supply, such as rechargeable lithium battery. the luminescent unit 33 includes a light-emitting diode (LED) and an electronic ballast connected with the light-emitting diode.

The luminescent unit 33 can be solid-state or organic light-emitting diode (LED) bulbs, or LED tubes or LED strips or LED fixtures, and the luminescent unit 33 are electronic ballast driven discharge lamps.

Figure 6:
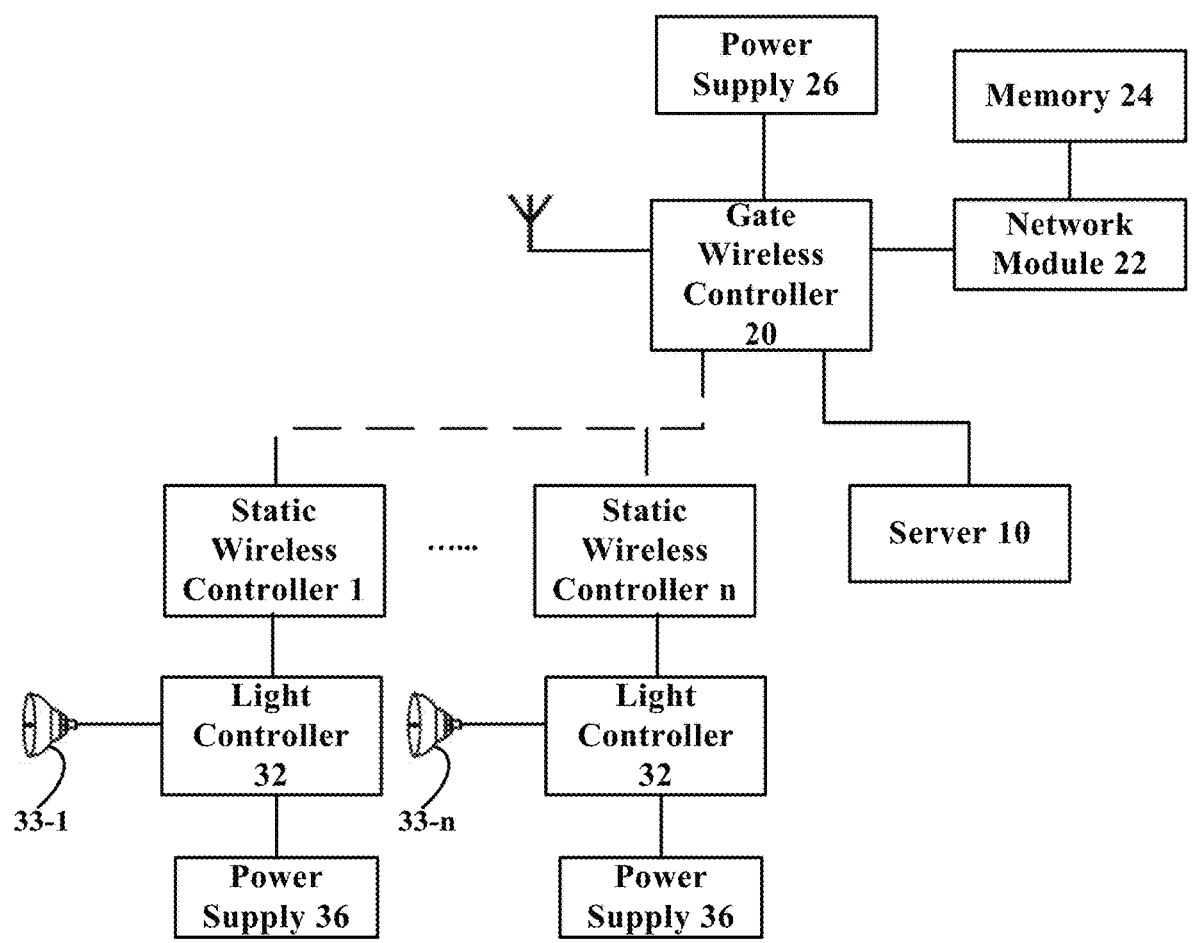
FIG. 6 is a diagrammatic view of a position estimating lighting system according to one embodiment of the present disclosure.

The lighting devices shown in FIG. 8 includes the luminescent unit 33 (such as LED bulbs, LED tubes, LED stripes, Organic LED products and linear and compact fluorescent tube products) are distributed in a building or a premise. With the static module from the wireless technology embedded, the lighting devices can act as the static modules of the mesh network. By linking them to a Gateway device (i.e. the connection to an external server, such as computer or a computer network, as shown in FIG. 6 and FIG. 7, they can be used to locate the dynamic positions of the mobile terminals in the building or premise.

The Mobile Terminals (MT) is wirelessly connected to the static module. The gateway device is connected with the server 10, the static module in the lighting device calculates position information of the connected mobile terminal in reference to static modules and/or adjacent mobile terminals in the mesh network, and delivers the position information to the server 10 by the gateway device, and the server 10 collects the position information of the mobile terminal and modulates illumination of the luminescent unit 33 based on the position information.

The mobile terminals (MT) are small and battery-powered devices that have to be located in the building or premise. Normally The mobile terminals do not store network-wide information and perform network-related activities. In one wireless technology embodiment, an example of the setup of a MT is shown in FIG. 6. The mobile terminals can be smart mobile phones, smart watches and any electronic products with the wireless communication mobile terminals or tags.

Figure 10:
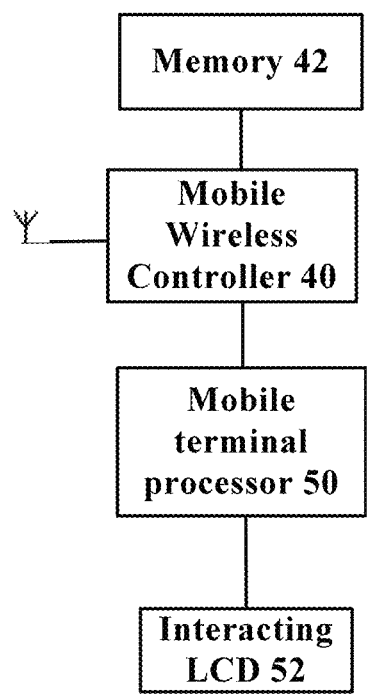
FIG. 10 is a diagrammatic view of a mobile terminal according to an mobile phone embodiment of the present disclosure.

Referring to FIG. 10, in one embodiment of the mobile terminal, it can be a smart mobile phone holding by a system client. Each of the mobile terminals includes a mobile wireless controller 40 for building the mesh network, a mobile terminal processor 50 and an interacting LCD 52. The mobile terminal processor 50 is connected with the mobile wireless controller 40. By the mobile wireless controller 40, the smart mobile phone can receive information and data from the server 10. The system client can get introductions according to present location in the building or premise from the server 10 and finish interactive operation on the interacting LCD 52. The mobile terminals are registered in the server 10 before joining the mesh network.

Figure 9:
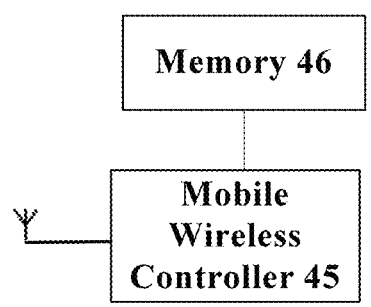
FIG. 9 is a diagrammatic view of a mobile terminal according to a tag embodiment of the present disclosure.

Referring to FIG. 9, in another embodiment of the mobile terminal, the mobile terminals are tags adhere to loads of a factory, production line or a storage facility. Each of the tags includes a mobile wireless controller 45 for building a mesh network with one of the adjacent static modules and/or gateway device. The mobile wireless controller 45 is communicated with a memory 46. The mobile terminals i.e., the tags are registered in the server before joining the mesh network.

In wireless technology applied in the present embodiment, a dynamic wireless mesh network can be formed as shown in FIG. 3. A MT can be located with three links with the SM and/or GD. An example is MT1 in FIG. 3. However, other MT can be used to assist the location of another MT if the number of link with the SM is less than three. Examples are the nodes MT2 and MT3 in FIG. 4.

Figure 4:
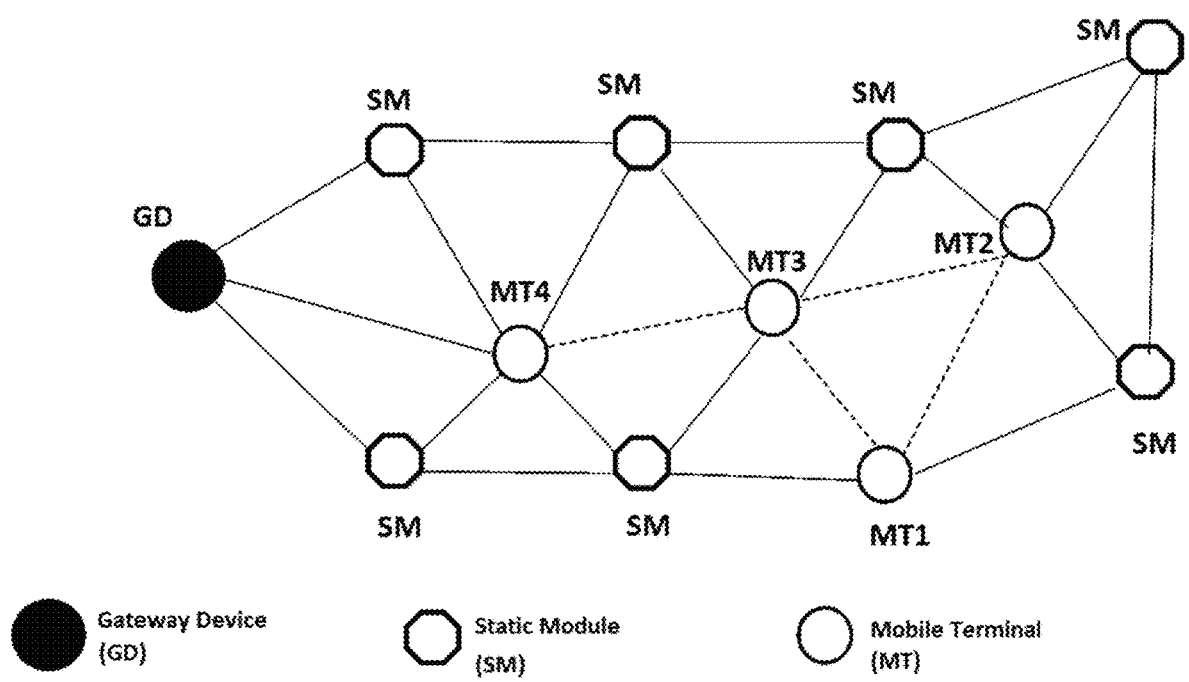
FIG. 4 is a s schematic diagram illustrating position estimation in the mesh network according to some embodiment of the present disclosure.

FIG. 4 shows a simplified diagram of the combined lighting and wireless mesh network. The Static modules (SM) represent the lighting devices or lighting fixtures equipped with the wireless technology. They are installed in the building or premise in a distributed manner. The Static modules can locate the positions of the Mobile terminals with at least 3 distances among them. These links can be "direct link" with a Gateway device or Static module (which acts as a position reference) as represented by a solid line in FIG. 4. If a Mobile terminal is not directly linked with at least 3 Static modules, its position can also be estimated from its links with other Mobile terminals. For example, the Mobile terminal (MT1) has two direct links with Static modules. It has wireless links with MT2 and MT3, both of which have at least three direct links.

As long as a mobile terminal has at least three links with other Nodes as explained in the previous section, the distances of a minimum of three wireless links can be used to determine the position of the mobile terminal accurately.

In the embodiment, it must be stressed that any wireless technology with the capability of forming a dynamic wireless mesh network like the IEEE 802 based wireless technologies shown in Table 1 can also be used.

The computer or computer network associated with the Gateway device can collect and store the position information collected from the mesh network and mobile terminals registration information and form the flow information. Software can be developed and installed in the computer or computer network to use such information for providing a range of functions (such as lighting control, fault reporting of lighting devices, counting the numbers of people or objects etc). Such information can further be used for other new functions.

The combined location estimating lighting system can obviously offer monitoring and control of the lighting system, it provides a wireless communication platform for many applications related to the usage of the building or premise. The position information, flow information (such as people/object numbers and movements) and registration information collected by the Gateway device can be used for a range of applications.

The static module in each lighting device monitors operation of the lighting device and generates signals to report abnormal status and location thereof, the server 10 controls the light intensity and/or color of the lighting devices by sending control message to relating lighting device through the gateway device so as to achieve an objective of reducing energy usage.

In the embodiment, the lighting devices includes the static wireless controller 30 for building the mesh network the light controller 32 to control illumination of the luminescent unit 33. The lighting devices provides monitoring and control functions for the lighting system through the mesh network. The control signals from the server 10 access to the light controller 32 by the static wireless controller 30. the light controller 32 receives signals representing the operating conditions and status of the lighting device and/or lighting fixture. The static wireless controller 30 have the ability to provide at least one control signal for controlling operating conditions of the lighting device or lighting fixture. For example, the control signals for the operating conditions can be turning-on/turning off, light intensity and/or color.

Figure 12:
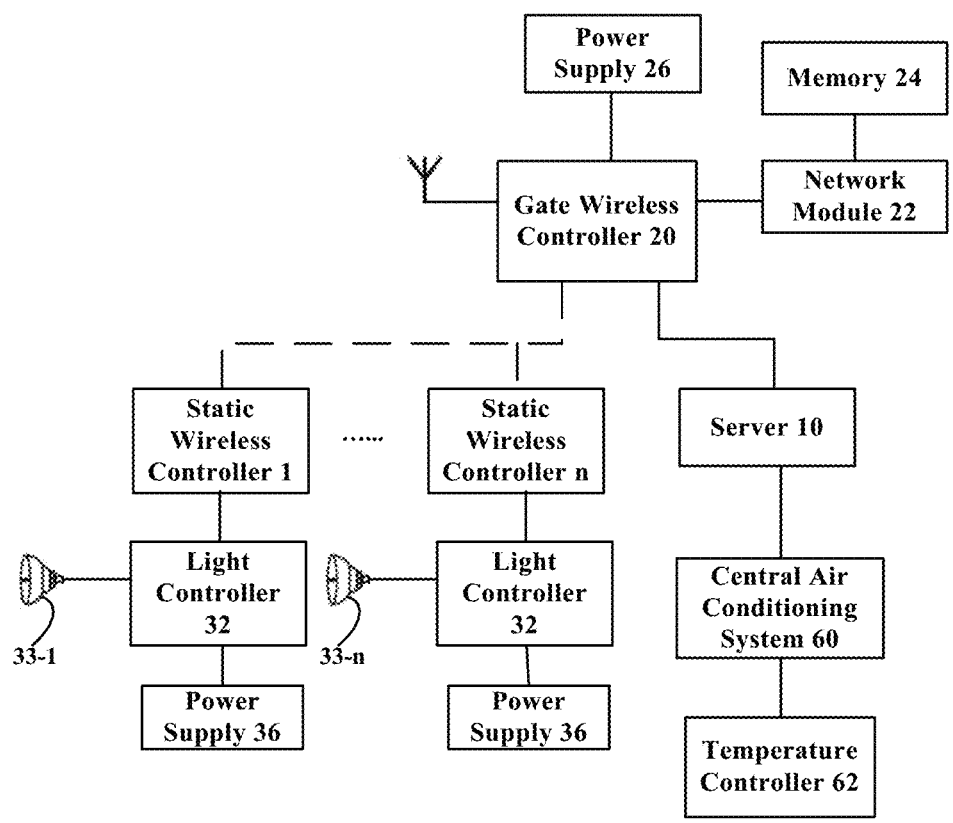
FIG. 12 is a diagrammatic view of a position estimating lighting system combined with a central air conditioning system according to some embodiment of the present disclosure.

Referring to FIG. 12, in one embodiment, the server is connected with a central air conditioning system 60 to share the flow information, the central air conditioning system 60 includes plural temperature controllers 62, and the temperature controllers 62 are regulated according to the flow information or position information of the registered mobile terminals so as to control and optimize energy usage (such as light intensity and air-conditioning) of the building or premise.

In the application example of energy control, the mesh network can acquire the locations of the people in a building or premise and incorporate the lighting system and the central air conditioning system 60 to accomplish lighting control and air-conditioning control for the targeted areas. For example, if there are regions where there is no people for a prolonged period, the light intensity and cooling in these regions can be reduced. In regions which are affected by the variations of natural sunlight, the combined network can work with indoor light sensors (temperature sensors) in order to regulate the light intensity (temperature) in those areas to a stable or pre-set level.

Figure 13:
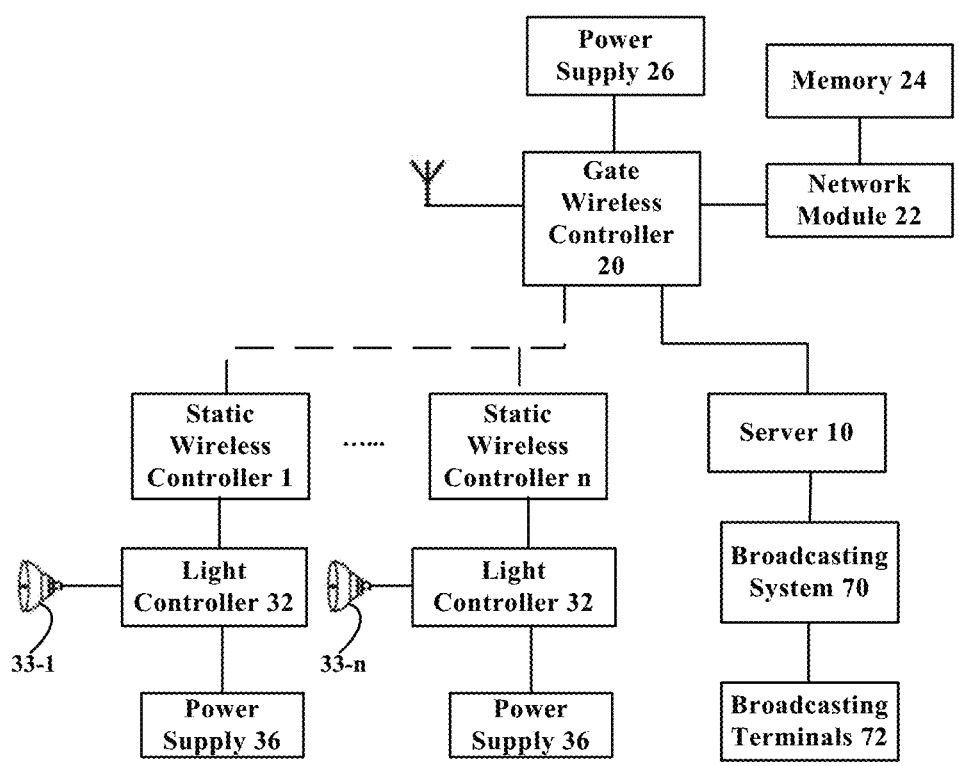
FIG. 13 is a diagrammatic view of a position estimating lighting system combined with a broadcasting system according to some embodiment of the present disclosure.

Referring to FIG. 13, in another embodiment, the server is connected with a broadcasting system 70 to share the flow information. The broadcasting system 70 includes plural broadcasting terminals 72, and relevant broadcasting terminals 72 are selected according to the flow information or position information of the registered mobile terminals.

In a application example of a shopping mall, the combined mesh network can incorporate a software installed in the server 10 to determine the number of people and their movements. Such people flow information can be used to study the consumer behaviour and interests, so that the management entities can use it for planning business strategies and rental values of the premises. In case of emergency, public announcements by the broadcasting system 70 can be directed to those crowded regions in the building or premise to provide instructions to guide the people to the appropriate safety exits.

The position information, flow information and registration information obtained in the combined position estimating lighting system can be used to provide information for studying and extracting consumer behaviour for business and management purposes and/or for carrying out regional marketing and promotion campaign if the building or premise is a shopping mall or public infrastructure.

In the application example of an airport, the mesh network combined the broadcasting system 70 based upon the registration information can incorporate a mechanism to locate and contact passengers. For example, passengers who have not turned up at the Boarding Gates can be located and contacted immediately.

In the application example of a hospital, incorporating the lighting system with mesh network combined the broadcasting system based upon the registration information, medical staff and patients wearing compatible wireless tags can be located and contacted if necessary.

In the general application in a building, incorporating the mesh network combined the broadcasting system based upon the registration information, the lighting system can provide access and security control. The people flow information can also be used for human resource management such as staff attendance recording and payroll management.

In the application examples of a factory, production line or a storage facility, equipped with the lighting system with mesh network combined the broadcasting system based upon the registration information are capable of registering and/or locating the positions and/or the movements of the objects carrying the compatible wireless tags. the information disclosed above can be used for load position identification and load flow control.

Figure 5:
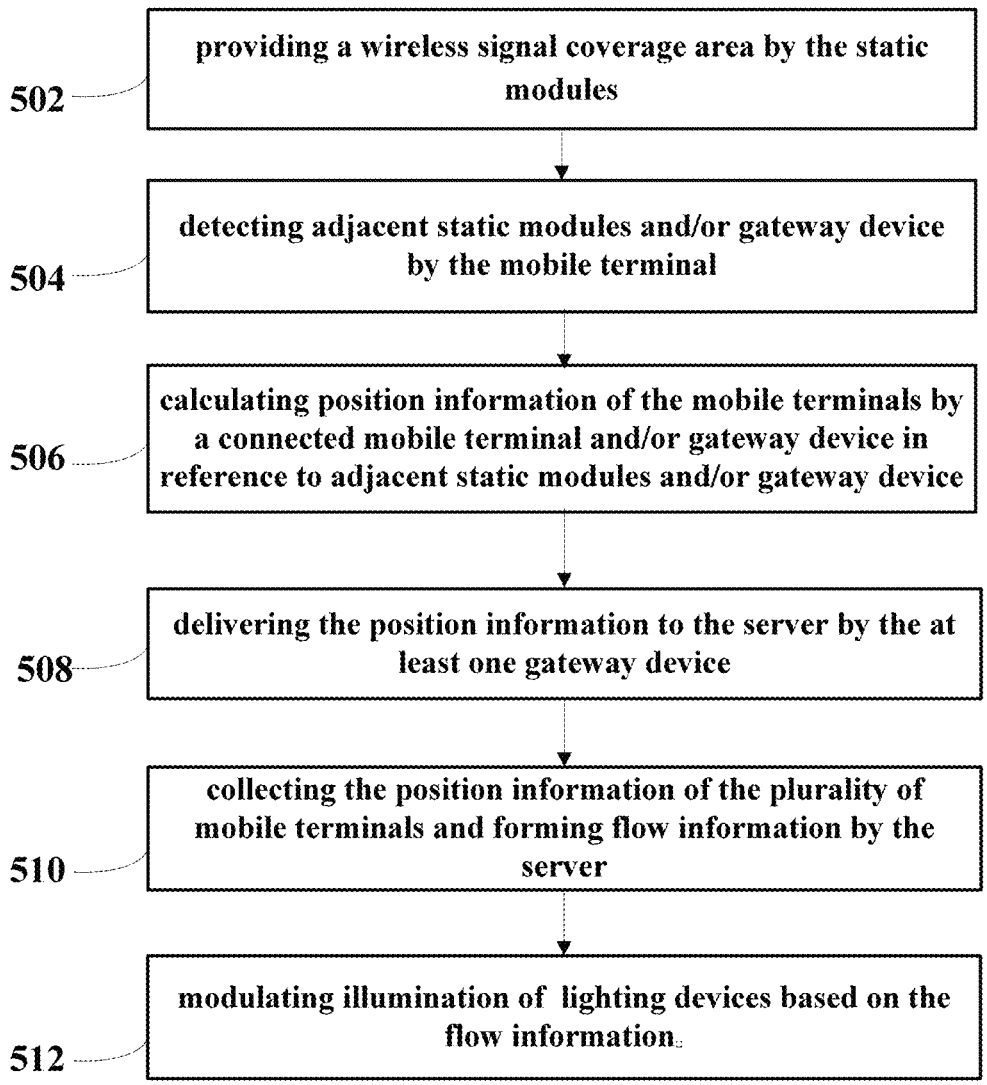
FIG. 5 is a flowchart showing a position estimating method according to one embodiment of the present disclosure.

Referring to FIG. 5, the present disclosure further provide a position estimating method. The example method is provided by way of example, as there are a variety of ways to carry out the method. Each block shown in FIG. 5 represents one or more processes, methods or subroutines, carried out in the example method. Furthermore, the illustrated order of blocks is illustrative only and the order of the blocks can change according to the present disclosure. Additional blocks can be added or fewer blocks may be utilized, without departing from this disclosure. The example method can begin at block 501.

The position estimating method applied in the building or premise, and executed by the position estimating system. the position estimating system includes a server connected to at least one gateway device, a plurality of static modules distributed around the building or premise wirelessly connected to the at least one gateway device and a plurality of mobile terminals. The method includes block 502 to block 512.

at block 502, the gate device, the static modules and the mobile terminals form the mesh network, and a wireless signal coverage area by the static modules distributed inside the building or premise.

at block 504, the mobile terminal reaching the wireless signal coverage area detects adjacent static modules and/or gateway device, and prepare to establish connection therebetween, the mobile terminal connects the adjacent static modules and/or gateway device detected.

at block 506, one of the connected static modules calculates position information of the mobile terminals by a connected mobile terminal and/or gateway device.

at block 508, the calculating static module delivers the position information to the server by the gateway device.

at block 510, the server collects the position information of the plurality of mobile terminals and forming flow information.

In the method embodiment, the static modules are installed in the lighting devices, and the method further includes block 512. At block 512, the server modulates illumination of the lighting devices based on the flow information.

In the method embodiment, the mobile terminals are registered in the server before joining the wireless signal coverage area. The wireless signal coverage area is compatible with IEEE 802 based standard wireless communication protocols.

In the method embodiment, the static modules monitor operation of the lighting devices, and generate signals to report abnormal status and location to the server. And the server controls the light intensity and/or color of the lighting devices and sends control message to relating lighting device through the gateway device.

In application embodiment, the server is connected with the central air conditioning system to share the flow information, the central air conditioning system includes plural temperature controllers. The method further includes regulating the temperature controllers according to the flow information or position information of the registered mobile terminals.

In application embodiment, the server is connected with the broadcasting system to share the flow information, the broadcasting system includes plural broadcasting terminals, the method further includes selecting relevant broadcasting terminals according to the flow information or position information of the registered mobile terminals.

Unlike previous suggestions of using Visual Light Communication for locating the positions of the mobile terminals in the prior art, this invention involves the embedment of wireless technology in the lighting devices installed in a building or premise to form a wireless mesh network for performing position location functions of people and/or objects, as well as lighting control.

Hence, this embodiment does not involve the use of VLC for position location, and will not suffer from the need for a light sensor (such as a camera in a mobile phone) must be under direct light in a VLC application. In the case of tracking objects in a premise, the need for a light sensor is a major limitation, because the objects may have to be stacked up in a pile and cannot have the installed light sensors under direct light from the lighting system.

The effective functions include, but not limited to: Monitoring the operating conditions of the light sources. Controlling the light intensity (i.e. dimming) and control of the light sources. Reporting abnormal situation of the light source (such as failure or malfunctions) to the Gate device. Monitoring position information of people with mobile terminal or objects carrying compatible wireless devices, such as tags in the building or premise. Use of the dynamic position information of people and/or objects to obtain flow information, such as people flow and/or load flow information respectively. Use of such flow information for a range of activities including, but not limited to, building and facilities management, control of energy usage or temperature, control of lighting energy, control of air-conditioning system, study of consumer behaviour in shopping malls, study and planning of rental strategies and commercial activities, security checks, locations of specific persons or objects, human resources management (such as attendance checks and payroll).

It should be finally noted that the above-described embodiments are merely for illustration of the present invention, but are not intended to limit the present disclosure. Although the present disclosure is described in detail with reference to these embodiments, a person skilled in the art may also make various modifications to technical solutions disclosed in the embodiments, or make equivalents relating to a part of or all technical features therein. Such modifications or replacement, made without departing from the principles of the present disclosure, shall fall within the scope of the present disclosure.

What is claimed is:

1. A position estimating lighting system, for being applied in a building or premise, comprising,
a server,
a lighting device, for being distributed around the building or premise and
a mobile terminal, wherein:
the light device comprises:
a light controller, switching and modulating a luminescent unit connected, and
a static module connected with the light controller, forming a mesh network with other static module and wirelessly connected to an gateway device,
wherein the mobile terminal is wirelessly connected to the static module, and
wherein the gateway device is connected with the server, the static module calculates position information of the connected mobile terminal, and delivers the position information to the server by the gateway device, and the server collects the position information of the mobile terminal and modulates illumination of the luminescent unit based on the position information.

2. The system according to claim 1, wherein the gateway device comprises gate wireless controller, network module and a memory, and the mobile terminal comprises mobile wireless controller for building the mesh network, a mobile terminal processor and an interacting LCD, the mobile terminal is registered in the server before joining the mesh network.

3. The system according to claim 1, wherein the mobile terminal is a tag comprising a mobile wireless controller, and the mobile terminal is registered in the server before joining the mesh network.

4. The system according to claim 1, wherein the static module in the lighting device monitors operation of the lighting device and generates signals to report abnormal status and location thereof, the server controls the light intensity and/or color of the lighting device by sending control message to the lighting device through the gateway device.

5. The system according to claim 2, wherein the server analyzes the position information from the mobile terminal to form flow information.

6. The system according to claim 5, wherein the server is connected with a central air conditioning system to share the flow information, the central air conditioning system comprises plural temperature controllers, and the temperature controllers are regulated according to the flow information or position information of the registered mobile terminal.

7. The system according to claim 5, wherein the server is connected with a broadcasting system to share the flow information, the broadcasting system comprises plural broadcasting terminals, and relevant broadcasting terminals are selected according to the flow information or position information of the registered mobile terminal.

8. A lighting device, for being distributed in a building or premise, comprising,
   a light controller, switching and modulating a luminescent unit connected, and
   a static module connected with the light controller, forming a mesh network with other static module and wirelessly connected to an gateway device, at least one mobile terminal wirelessly connected to the static module,
   wherein the gateway device is connected with a server, the static module calculates position information of the connected mobile terminal, and delivers the position information to the server by the gateway device, and the server collects the position information of the at least one mobile terminal and modulates illumination of the luminescent unit based on the position information.

9. A lighting system, for being applied in a building or premise, comprising,
   a server, connected to at least one gateway device,
   a plurality of static modules for being distributed around the building or premise wirelessly connected to the at least one gateway device, and
   a plurality of mobile terminals, wirelessly connected to adjacent static modules;
   wherein for each mobile terminal, one of the adjacent static modules calculates position information of the mobile terminal and delivers the position information to the server by the at least one gateway device, and the server collects the position information of the plurality of mobile terminals and forms flow information.

10. The lighting system according to claim 9, wherein the gateway device comprises gate wireless controller, network module and a memory, and each of the static modules comprises a static wireless controller for building a mesh network and a memory, each of the mobile terminals comprises mobile wireless controller for building the mesh network, a mobile terminal processor and an interacting LCD, the mobile terminals are registered in the server before joining the mesh network.

11. The lighting system according to claim 9, wherein the plurality of mobile terminals are tags comprising a mobile wireless controller for building a mesh network, the tags are registered in the server before joining the mesh network.

12. The lighting system according to claim 10, wherein the server is connected with a central air conditioning system for being installed in the building or premise to share the flow information, the central air conditioning system comprises plural temperature controllers, and the temperature controllers are regulated according to the flow information or position information of the registered mobile terminals.

13. The lighting system according to claim 10, wherein the server is connected with a broadcasting system for being installed in the building or premise to share the flow information, the broadcasting system comprises plural broadcasting terminals, and relevant broadcasting terminals are selected according to the flow information or position information of the registered mobile terminals.

14. A position estimating method, for being applied in a building or premise, and executed by a position estimating system, the position estimating system comprising a server connected to at least one gateway device, a plurality of static modules for being distributed around the building or premise wirelessly connected to the at least one gateway device and a plurality of mobile terminals, the method comprising,
   providing a wireless signal coverage area by the static modules,
   detecting adjacent static modules and/or gateway device by the mobile terminal,
   connecting the adjacent static modules and/or gateway device detected,
   calculating position information of the mobile terminals by a connected mobile terminal and/or gateway device,
   delivering the position information to the server by the at least one gateway device, and
   collecting the position information of the plurality of mobile terminals and forming flow information by the server.

15. The method according to claim 14, wherein static modules are installed in lighting devices, and the method further comprising modulating illumination of the lighting devices based on the flow information.

16. The method according to claim 14, wherein the method further comprising, registering the mobile terminals in the server before joining the wireless signal coverage area.

17. The method according to claim 15, wherein the method further comprising, monitoring operation of the lighting devices by the static modules, and generating signals by the static modules to report abnormal status and location to the server; and controlling the light intensity and/or color of the lighting devices by the server sending control message to relating lighting device through the gateway device.

18. The method according to claim 14, wherein the server is connected with a central air conditioning system to share the flow information, the central air conditioning system comprises plural temperature controllers, the method further comprising, regulating the temperature controllers according to the flow information or position information of the registered mobile terminals.

19. The method according to claim 14, wherein the server is connected with a broadcasting system to share the flow information, the broadcasting system comprises plural broadcasting terminals, the method further comprising, selecting relevant broadcasting terminals according to the flow information or position information of the registered mobile terminals.

\* \* \* \* \*